(12) United States Patent
Nicholas et al.

(10) Patent No.: US 6,419,293 B1
(45) Date of Patent: Jul. 16, 2002

(54) TORSION BAR FOR A DOOR LID

(75) Inventors: Nicole Nicholas, Warren; Anita Arora, Bloomfield Hills, both of MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 0 days.

(21) Appl. No.: 09/766,282

(22) Filed: Jan. 19, 2001

(Under 37 CFR 1.47)

(51) Int. Cl.[7] .............................. B62D 25/10; F16F 1/14
(52) U.S. Cl. ....................................................... 296/76
(58) Field of Search ........................................... 296/76

(56) References Cited

U.S. PATENT DOCUMENTS

| | | | | |
|---|---|---|---|---|
| 4,856,142 A | * | 8/1989 | Fukunaga | 296/76 |
| 5,195,796 A | * | 3/1993 | Wampler, II | 296/76 |
| 5,365,639 A | * | 11/1994 | Lewkoski | 296/76 |
| 5,513,891 A | * | 5/1996 | Horiuchi | 296/37.1 |
| 5,746,468 A | * | 5/1998 | Schoen et al. | 296/76 |
| 5,788,312 A | * | 8/1998 | Lee | 296/76 |
| 5,951,088 A | * | 9/1999 | Schoen et al. | 296/76 |
| 6,059,346 A | * | 5/2000 | Moon | 296/76 |

FOREIGN PATENT DOCUMENTS

| | | |
|---|---|---|
| JP | 55-94278 | 12/1978 |
| JP | 2875027 | 12/1990 |

* cited by examiner

*Primary Examiner*—Stephen T. Gordon
*Assistant Examiner*—Greg Blankenship
(74) *Attorney, Agent, or Firm*—Gifford, Krass, Groh, Sprinkle, Anderson & Citkowski, P.C.

(57) ABSTRACT

A torsion bar for use in raising a vehicle trunk lid has a center extender portion to increase the effective length of the torsion bar. The extender portion generally includes three U-shaped portions of the torsion bar which extend on a generally horizontal plane. Two of the U-shaped portions extend transversely across the vehicle. The third extends longitudinally. A pair of lifting portions extend radially at either end of the torsion bar. The lifting portions engage a link pivotally attached to hinge arms to form a biasing force to lift the trunk lid. The increased effective length of the torsion bar permits the torsion bar to produce desired lifting criteria while preventing the torsion bar from being overstressed.

7 Claims, 2 Drawing Sheets

TORSION BAR FOR A DOOR LID

BACKGROUND OF THE INVENTION

1. Field of the Invention

The present invention relates to a torsion bar and, more particularly, to a torsion bar for use in raising a door lid.

2. Description of the Prior Art

Torsion bars have been used in assisting in the opening and raising doors and lids of vehicles. Typically, the torsion bar has at least two radially extending U-shaped portions. These portions are typically formed by bending the bar. When the door is open, one of the radially extending portions contacts the underside of the door and the other radially extending portion contacts the structure adjacent the door. When the door is closed, it pushes one of the radially extending portions towards the other, twisting the rod and creating a spring-like tension in the rod.

Japanese Publication 2875027 discloses a torsion bar formed to raise the engine cover of a forklift truck. The torsion bar has a door lid lifting portion extending radially outwardly from the bar adjacent each of a pair of hinges. A center portion extends in a radially opposite direction to abut the inside of the engine compartment. When the engine cover lid is closed, the door lid arm portions are twisted towards the center arm to create a torsion in the torsion bar acting in opposition to the closure. If the weight of the lid is greater than the biasing force of the torsion bar, the engine lid will remain in the closed position. When the engine cover is lifted to access the compartment, the biasing force of the torsion bar assists in raising the lid and holding the lid in the open position.

It is also known to use torsion bars to open trunk lids and hoods in automobiles. However, there are a number of parameters which are desirable in designing a door lifting mechanism. It is desirable to provide a "pop-up" force to raise the trunk lid a short distance from its locked position without any outside assistance. It is also desirable to provide a "hold open" force which will support the door in any position where it is placed. It is desirable to have this force for use between the "pop-up" position and the approximately sufficient force to hold the door open in its fully extended position. In some cases, it is desirable that the torsion bar provide sufficient force to support in intermediate positions in between the pop-up position and the midway open position. Finally, the door should be forced to and held at the fully open position when raised by a person beyond the midway position. Thus, the torsion bar must have a large enough moment to open and support the door in this range of operation.

It has been difficult to find a good combination of all the variables to meet these design parameters. The length of typical torsion bars is such that these bars do not provide sufficient "hold open" force to support the door at the intermediate positions. Accordingly, it is known to use a pair of torsion bars such as disclosed in Japanese Patent No. 55-94278. Each bar has a radially extending portion which is positioned against one of the hinge links. The torsion bars are then mounted to cross each other. However, such an installation is costly to build and install. Accordingly, it would be desirable to have a single torsion bar which met the necessary design parameters and reduces the mass and cost of production.

SUMMARY OF THE INVENTION

The invention relates to a torsion bar having an effective additional length. The effective additional length permits the torsion bar to produce a greater torsion bar moment without exceeding the design stress. The torsion bar includes a length extender portion disposed between a pair of radially extending lifting portions. In the preferred embodiment, the length extender portion is formed by bending a center portion of the rod into a shape. The shape will depend on the space available to accept the extender portion. In this way the effective length of the torsion bar is increased by the length of the extender portion thereby providing the desired "pop opening" force, "holding" force and moment to support the trunk lid in the "hold open" position.

BRIEF DESCRIPTION OF THE DRAWING

Reference is made to the attached drawing of the present invention wherein reference numerals and description refer to like parts throughout the several views and in which.

DETAILED DESCRIPTION OF THE PREFERRED EMBODIMENTS

Figure 1:
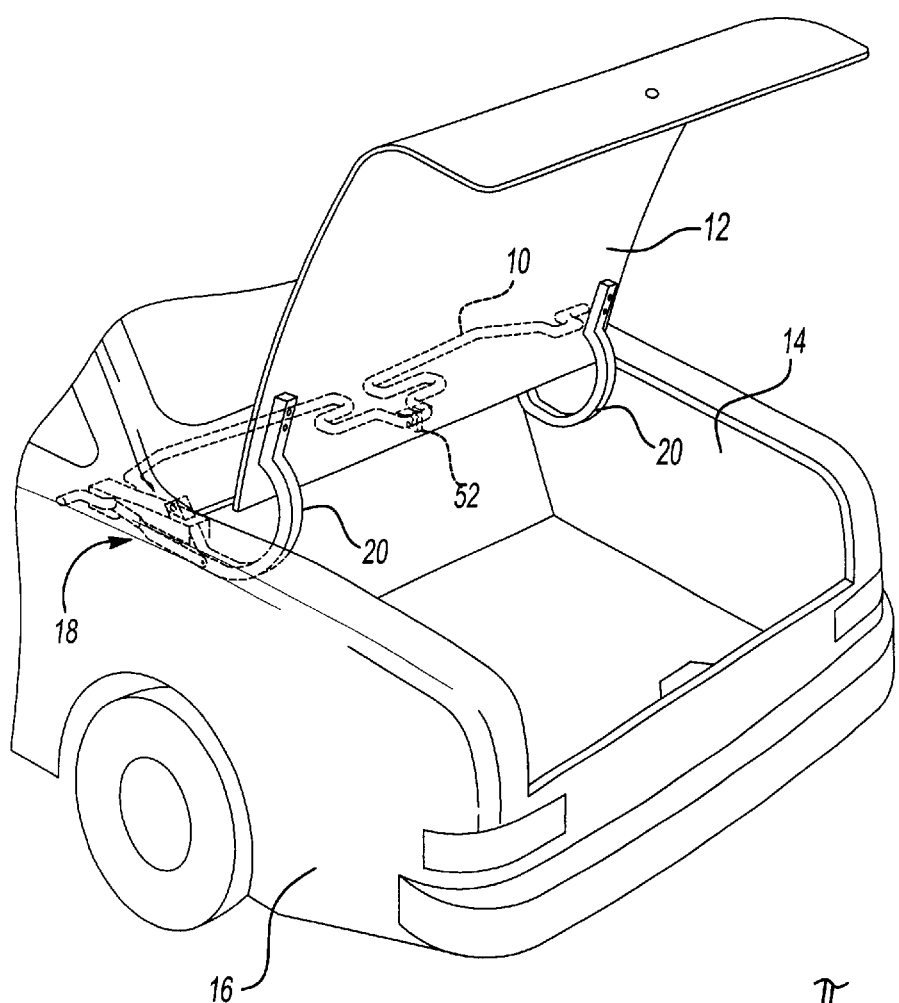
FIG. 1 is a perspective view of a vehicle and vehicle trunk lid with a torsion bar in accordance with the invention supporting the trunk lid.
Figure 2:
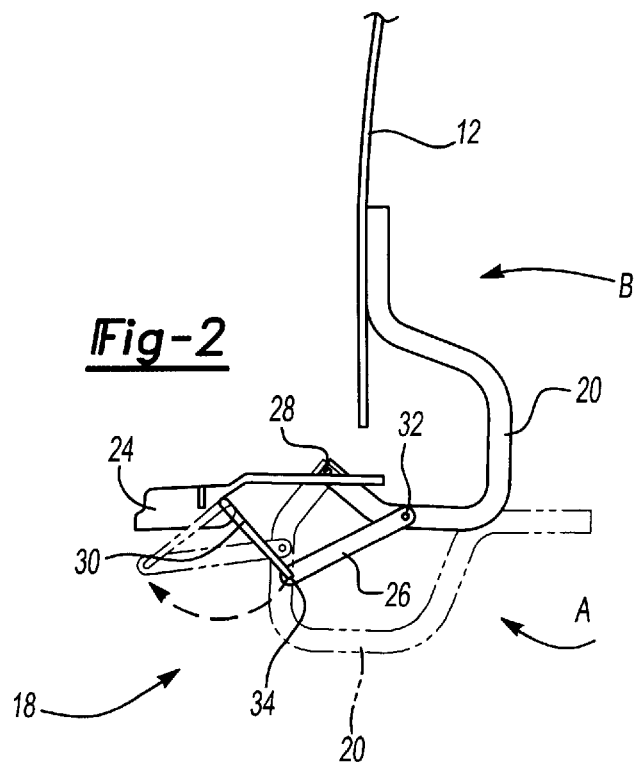
FIG. 2 is a side view of the trunk lid and hinge mechanism.
Figure 4:
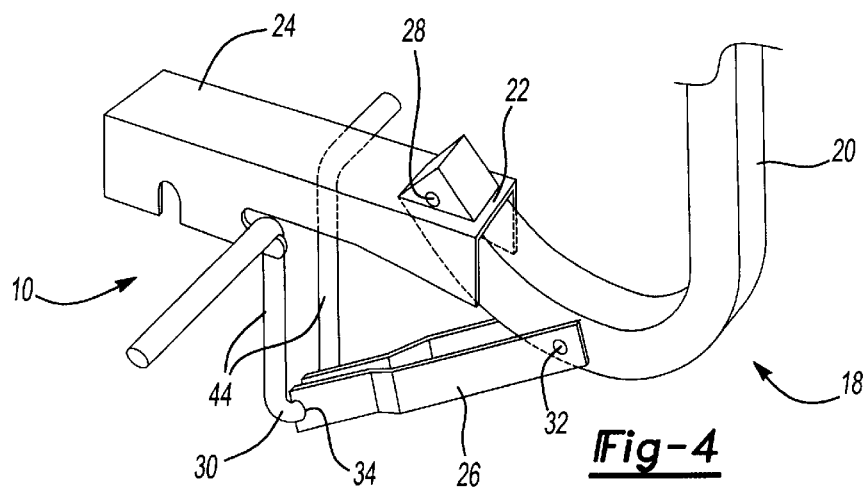
FIG. 4 is a partial perspective view of a hinge assembly in accordance with the invention.

A novel torsion bar 10 for opening a trunk lid 12 for a luggage compartment 14 of a vehicle 16 is shown in FIG. 1. The trunk lid 12 is movably supported by hinges 18 as shown in FIGS. 2 and 4. As shown in FIG. 4, each hinge 18 includes a hinge arm 20 which slides through an aperture 22.

As shown in FIG. 2, the trunk lid 12 moves with the hinge arm 20 in a hinge support 24 between a closed position "A" and an open position "B". The hinge support 24 is mounted within the luggage compartment 14. A pin 28 holds the hinge arm 20 from sliding through the aperture 22 in the hinge support 24. A link 26 extends between the hinge arm 20 and a lifting portion of the torsion bar 10. One end of the link 26 is attached by a pin 32 to the hinge arm 20. The other end of the link 26 has a notch 34 to accept the lifting portion 30 of torsion bar 10. As discussed below, the link 26 twists the torsion bar 10 as the trunk lid is closed (FIG. 2).

Figure 3:
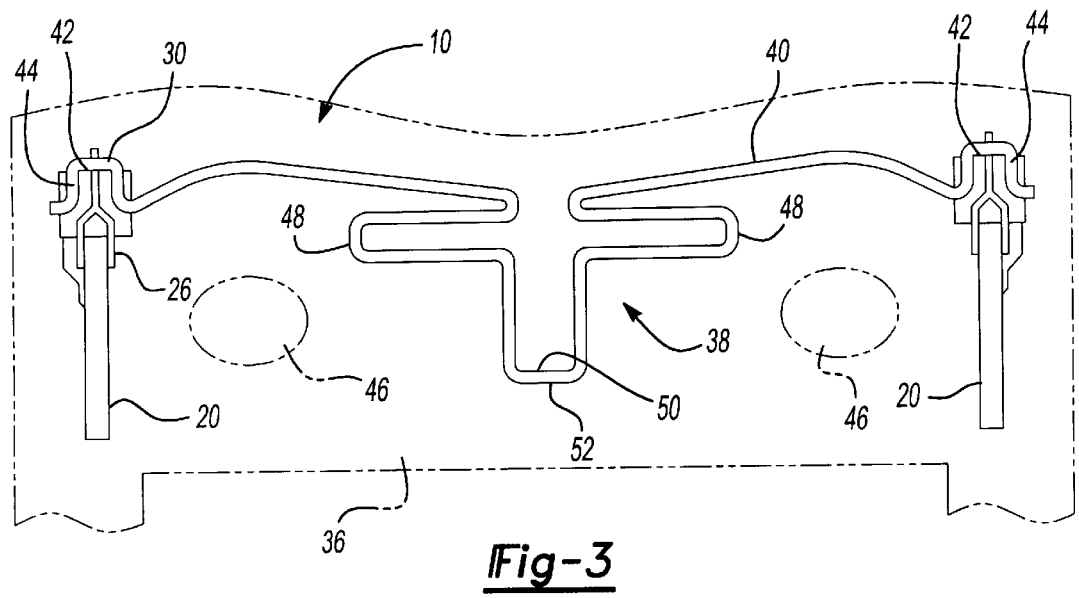
FIG. 3 is a top view of the torsion bar and the hinge mechanism in position in a vehicle in accordance with the invention.

As shown in FIG. 3, the torsion bar 10 is mounted to extend transversely across the vehicle beneath a rear deck 36. The torsion bar 10 is roughly formed in a single piece of ASTM 8227 or SAE 9254 or similar material. The torsion bar 10 has an extender portion 38 centrally disposed between a pair of rod portions 40 and the lifting portions 30. Each lifting portion 30 is adjacent an end of the torsion bar 10 and displaced angularly approximately 60° from the center portion which extends along a horizontal plane when installed. In the preferred embodiment, the torsion bar is bent into shape from a single rod. However, the torsion bar could be formed by welding one or more segments together.

As shown in FIG. 3, each lifting portion 30 is formed by bending into a generally U-shape. A transverse portion 42 engaging the link 26 and extends between a pair of radially extending arms 44 for engaging the link 26 to assist in raising the trunk lid 12. The rod portions 40 extend between the lifting portions 30 and the extender portion 38. The rod portions 40 may be bowed or curved to accommodate the placement of rear speakers 46 in the rear deck 36 as shown in FIG. 3.

The torsion bar 10 is bent approximately 180° at an inner end of each of the rod portions to the extender portion 38. The extender portion 38 extends on a horizontal plane along a longitudinal axis which is parallel with a longitudinal axis of a vehicle. In the preferred embodiment, the extender portion has a center portion 50 extending along the longitudinal axis between a pair of transverse portions 48 which extend in opposite directions along an axis which extends transversely across the vehicle. The center portion 50 and transverse portions 48 are formed as in an inverted U-shape with the openings adjacent each other.

A bracket 52 is mounted beneath the rear deck 36 of the luggage compartment 14 to hold the torsion bar 10. The bracket 52 has a hook portion which engages the center portion 50 of torsion bar 10. The length of the extender portion 38 is chosen to provide the torsion bar 10 with the desired overall length to provide the desired torsion. In the preferred embodiment, the length of the torsion bar between the lifting portions 30 is approximately 150–200% of the distance between the hinge supports 24.

OPERATION

The trunk lid and torsion bar are installed in the vehicle in the normal fashion. The hinge is mounted first and then the trunk lid is mounted to the hinge. The torsion bar 10 is then mounted in the vehicle. The lifting portions 30 of the torsion bar 10 are placed in the notches 34 of the links 26. The transverse portion of the center portion 50 is snapped into the hook portion of the bracket 52. When the trunk lid 12 is closed, the links 26 displace the lifting portions 30 in an arc toward the front of the vehicle 16.

The displacement of the lifting portions 30 during closing twists the torsion rod 10 to develop a lifting force. The lifting force length of the torsion bar 10 has been increased by the extender portion 38 so that the torsion bar 10 provides sufficient "pop up" force and holding force while not overstressing the torsion bar 10. The torsion bar 10 effectively meets the desired lifting criteria.

The discussion and examples hereinabove represent a specific embodiment of applications of the present invention. Within the guidelines given herein, one of skill in the art could readily recognize variations of the invention. Therefore, it is to be understood that the foregoing discussion, description and example are illustrative of a particular embodiment of the present invention but are not meant to be limitations upon the practice thereof. It is the following claims, including all equivalents, which define the scope of the invention.

We claim:

1. A torsion bar for use in combination with a door and a pair of hinge assemblies, said torsion bar comprising:

an extender portion and a pair of lifting portions spaced apart a predetermined distance, said torsion bar further having a pair of rod portions, each of said rod portions extending from one of said lifting portions towards said extender portion, said extender portion having a longitudinal axis extending transversely to a plane extending through said pair of hinge assemblies, said extender portion having at least one portion extending in a direction away from said longitudinal axis, said extender portion and said rod portions having a combined length greater than said predetermined distance between said pair of lifting portions having a lifting portions engaging one of said pair of hinge assemblies to be twisted away from a center portion when said door is closed.

2. The torsion bar of claim 1 wherein said at least one portion of said extender portion has a pair of transverse portions connected together by a center portion.

3. The torsion bar of claim 2 wherein said pair of transverse portions have an equal length.

4. The torsion bar of claim 3 wherein each of said pair of transverse portions have a generally U-shape.

5. The torsion bar of claim 1 wherein said center portion has a generally U-shape.

6. The torsion bar of claim 3 wherein said pair of rod portions have a length greater than said transverse portions of said extender portion.

7. A lifting assembly for raising a door with respect to a deck, said lifting assembly comprising:

a pair of hinge assemblies extending between said deck and said door, a torsion bar having a pair of lifting portions and an extender portion, said extender portion engaging said deck, each of said pair of lifting portions engaging one of said hinge assemblies, said torsion bar further having at least one rod portion extending between said extender portion and one of said lifting portions, said extender portion having at least one transverse portion extending in a direction away from a center portion.

* * * * *